United States Patent
Ono et al.

(10) Patent No.: US 7,391,131 B2
(45) Date of Patent: Jun. 24, 2008

(54) METHOD AND APPARATUS FOR STARTING CONTROL OF VEHICLE

(75) Inventors: Yasuo Ono, Hyogo (JP); Norio Tsuruta, Hyogo (JP); Masahumi Nishi, Hyogo (JP)

(73) Assignee: Fujitsu Ten Limited, Kobe (JP)

( * ) Notice: Subject to any disclaimer, the term of this patent is extended or adjusted under 35 U.S.C. 154(b) by 374 days.

(21) Appl. No.: 11/341,728

(22) Filed: Jan. 30, 2006

(65) Prior Publication Data
US 2006/0175900 A1    Aug. 10, 2006

(30) Foreign Application Priority Data
Feb. 4, 2005    (JP)    ............... 2005-029785

(51) Int. Cl.
   *B60R 22/00*    (2006.01)
(52) U.S. Cl. ................................... 307/10.6
(58) Field of Classification Search ............. 307/10.6
   See application file for complete search history.

(56) References Cited

U.S. PATENT DOCUMENTS 6,548,915 B1 * 4/2003 Geber et al. ............... 307/10.2

2004/0262068 A1  12/2004  Matsubara et al.

FOREIGN PATENT DOCUMENTS

| JP | A 09-303020 | 11/1997 |
|----|-------------|---------|
| JP | A 09-322265 | 12/1997 |
| JP | A 10-131569 | 5/1998 |
| JP | A 10-148170 | 6/1998 |
| JP | A 10-176642 | 6/1998 |
| JP | A 2000-025573 | 1/2000 |
| JP | A 2001-049917 | 2/2001 |
| JP | A 2002-130034 | 5/2002 |
| JP | A 2004-068626 | 3/2004 |

* cited by examiner

*Primary Examiner*—Robert L. Deberadinis
(74) *Attorney, Agent, or Firm*—Oliff & Berridge, PLC

(57) ABSTRACT

A vehicle can have an electronic configuration or a mechanical configuration. In the electronic configuration, a button is operated to start the engine of the vehicle. In the mechanical configuration, a key is inserted in a key cylinder to start the engine of the vehicle. A button signal is output when the button is operated. A key signal is output when the key is inserted in the key cylinder. The configuration of vehicle can be automatically detected based on whether the button signal is output or the key signal is output. An appropriate starting control for the engine is selected based on the configuration of the vehicle.

11 Claims, 8 Drawing Sheets

METHOD AND APPARATUS FOR STARTING CONTROL OF VEHICLE

CROSS-REFERENCE TO RELATED APPLICATIONS

This application is based upon and claims the benefit of priority from Japanese Patent Application No. 2005-029785, filed Feb. 4, 2005, the entire contents of which are incorporated herein by reference.

BACKGROUND OF THE INVENTION

1. Field of the Invention

The present invention relates to a technology for starting a vehicle self-directively or based on a command from a remote terminal.

2. Description of the Related Art

Recently, vehicles have been put into practical use in which it is possible to start the engine by remote control or by a timer. In such a vehicle, as a consequence, it becomes possible to warm up the vehicle and/or start the air-conditioner of the vehicle in advance, i.e., before the driver or passengers get into the vehicle.

These vehicles include a starting control apparatus that starts the engine when a certain condition is satisfied. The condition is satisfied when the starting control apparatus receives a remote command to start the engine or when a set time is reached. The starting control apparatus carries out an operation similar to a starting operation by the typical car key when the certain condition is satisfied. Namely, the starting control apparatus activates a starter motor and the engine controller then carries out fuel injection.

Sometimes the starting control apparatus is installed in the vehicle after the vehicle is bought. Immobilizers have become popular that immobilize the engine or certain other functions unless an authentic car key is used to start the engine. When the starting control apparatus is installed in a vehicle equipped with an immobilizer, because the immobilizer immobilize the engine unless an authentic car key is used, it becomes necessary to cancel the effect of the immobilizer to obtain the effect of the starting control apparatus. One approach is to send an authentication code from the starting control apparatus to the immobilizer. A conventional technology has been disclosed, for example, in Japanese Patent Publication No. 3365716 and Japanese Patent Publication No. 3365717.

Mainly two configurations are currently available for starting an engine of a vehicle: mechanical and electronic. In the mechanical configuration, a key is inserted into a key cylinder and the key is turned. In the electronic configuration, also popularly know as push-starting system, a button is operated.

Thus, there are various configurations for starting an engine of a vehicle. If different starting control apparatuses are produced for vehicles having different configurations, it results in an increase in the cost. Moreover, even if a starting control apparatus that is applicable to both the configurations, mechanical and electronic, is produced, efforts are required to be taken to register the configuration of the vehicle in the starting control apparatus.

Thus, there is a need for development of a starting control apparatus that can automatically identify the configuration of the vehicle in which it is installed and select an appropriate mode for starting control of the engine.

SUMMARY OF THE INVENTION

It is an object of the present invention to at least solve the problems in the conventional technology.

According to an aspect of the present invention, an apparatus that controls starting of an engine of a vehicle any one of self-directively and in response to a remote signal received from a remote terminal, includes a configuration identifying unit that identifies a configuration of the vehicle; and a control processing unit that selects starting control for the engine based on identified configuration and carries out selected starting control on the engine.

According to an aspect of the present invention, a method of controlling starting of an engine of a vehicle any one of self-directively and in response to a remote signal received from a remote terminal, includes identifying a configuration of the vehicle; and selecting starting control for the engine based on identified configuration; and carrying out selected staring control.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Exemplary embodiments of an in-vehicle system according to the present invention are explained below in detail with reference to the accompanying drawings.

Mainly two configurations are currently available for starting an engine of a vehicle: mechanical and electronic. In the mechanical configuration, a key is inserted into a key cylinder and turned. In the electronic configuration, also popularly know as push-starting system, a button is operated.

Figure 1:
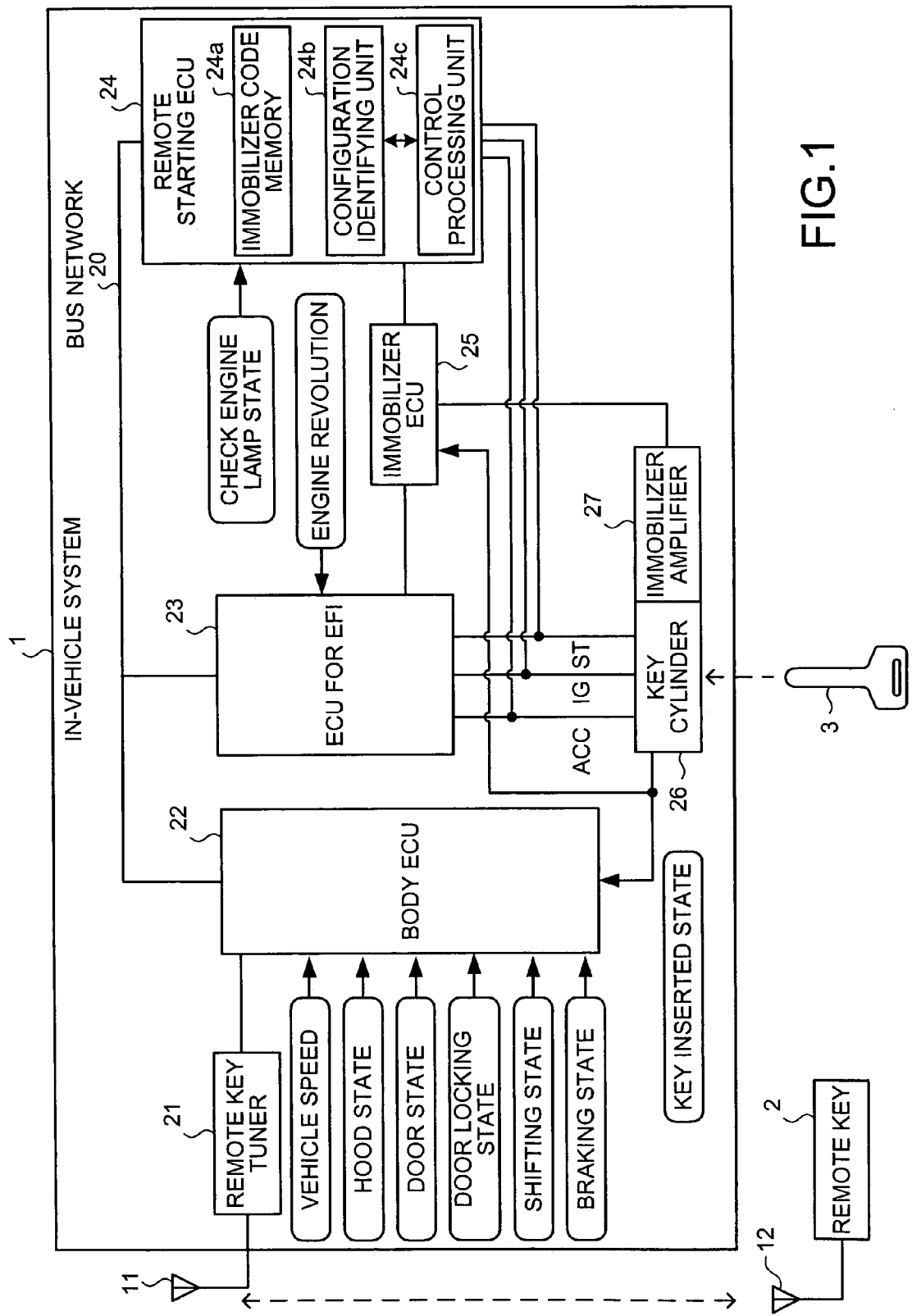
FIG. 1 is a block diagram of an in-vehicle system with the mechanical configuration according to an embodiment of the present invention.

FIG. 1 is a block diagram of an in-vehicle system 1 according to an embodiment of the present invention with the mechanical configuration. The in-vehicle system 1 includes an antenna 11, a remote key tuner 21, a body electrical control unit (ECU) (body ECU) 22, an electrical control unit for electronic fuel injection (ECU for EFI) 23, a remote starting ECU 24, an immobilizer ECU 25, a key cylinder 26, and an immobilizer amplifier 27.

The user of the vehicle in which the in-vehicle system 1 is installed is given a remote key 2. The remote key 2 is a remote operation terminal for remotely operating the vehicle. The remote key 2 is provided with an antenna 12 for outputting signals indicative of requests. The remote key 2 outputs an engine starting request and/or an engine stopping request. The remote key 2 can also be configured to output a door locking request and/or a door unlocking request in addition to the engine starting request and/or the engine stopping request. The remote key tuner 21 receives the requests output from the remote key 2 via the antenna 12.

The user of a vehicle in which the in-vehicle system 1 is installed is also given a key 3. The key 3 is used for manually starting/stopping the engine of the vehicle. The key 3 can be configured to open/close the doors of the vehicle.

The body ECU 22 controls states of the vehicle. Specifically, the body ECU 22 acquires information indicative of the speed of the vehicle (vehicle speed), whether the hood of the vehicle is open or closed (hood open/close state), whether the doors of the vehicle are open or closed (door open/close state), whether the doors are locked or unlocked (door locking/unlocking state), in which gear the vehicle is running (gear state), whether brakes are applied (braking state), and whether the key 3 is inserted in the key cylinder 26 (key state).

The body EUC 22 acquires the information indicative of the vehicle speed from a vehicle speed sensor (not shown), the hood open/close state from a hood switch (not shown), the door open/close state from a door opening/closing switch (not shown), the door locking/unlocking state from a door locking switch (not shown), the gear state from a gear-change switch (not shown), and the braking state from a braking switch (not shown).

The body ECU 22 is also connected to the remote key tuner 21 and a bus network 20, outputs the input information to the bus network 20, and communicates with the ECU for EFI 23 and the remote starting ECU 24 via the bus network 20. The ECU for EFI 23 is configured to electronically control the operations of the engine. Specifically, the ECU for EFI 23 starts operations in response to a connection with an ignition line (IG), and when detecting that a starter motor (not shown) starts rotating in response to a connection with a starter line (ST), the ECU for EFI 23 carries out fuel injection into the engine and ignition control to start and operate the engine. When the ignition line is released, the ECU for EFI 23 terminates fuel injection and stops the engine.

The ECU for EFI 23 acquires information relating to the states of the engine, such as an engine speed. The ECU for EFI 23 uses the acquired information to control the engine. The ECU for EFI 23 is connected to the bus network 20. The ECU for EFI 23 communicates with the body ECU 22 and the remote starting ECU 24 via the bus network 20, receives output information from each of the ECUs, and transmits input information in the ECU for EFI 23.

The ECU for EFI 23 is connected to the immobilizer ECU 25. The immobilizer ECU 25 reads a key code from the key 3 when the key 3 is inserted into the key cylinder 26, and performs an authentication check to check if the key 3 is an authentic key based on the key code. If the key is not authentic, the immobilizer ECU 25 inhibits the engine starting. If the key is authentic, the immobilizer ECU 25 cancels inhibition on starting the engine, i.e., permits engine starting. Thus, the immobilizer ECU 25 helps to prevent car theft.

Figure 2:
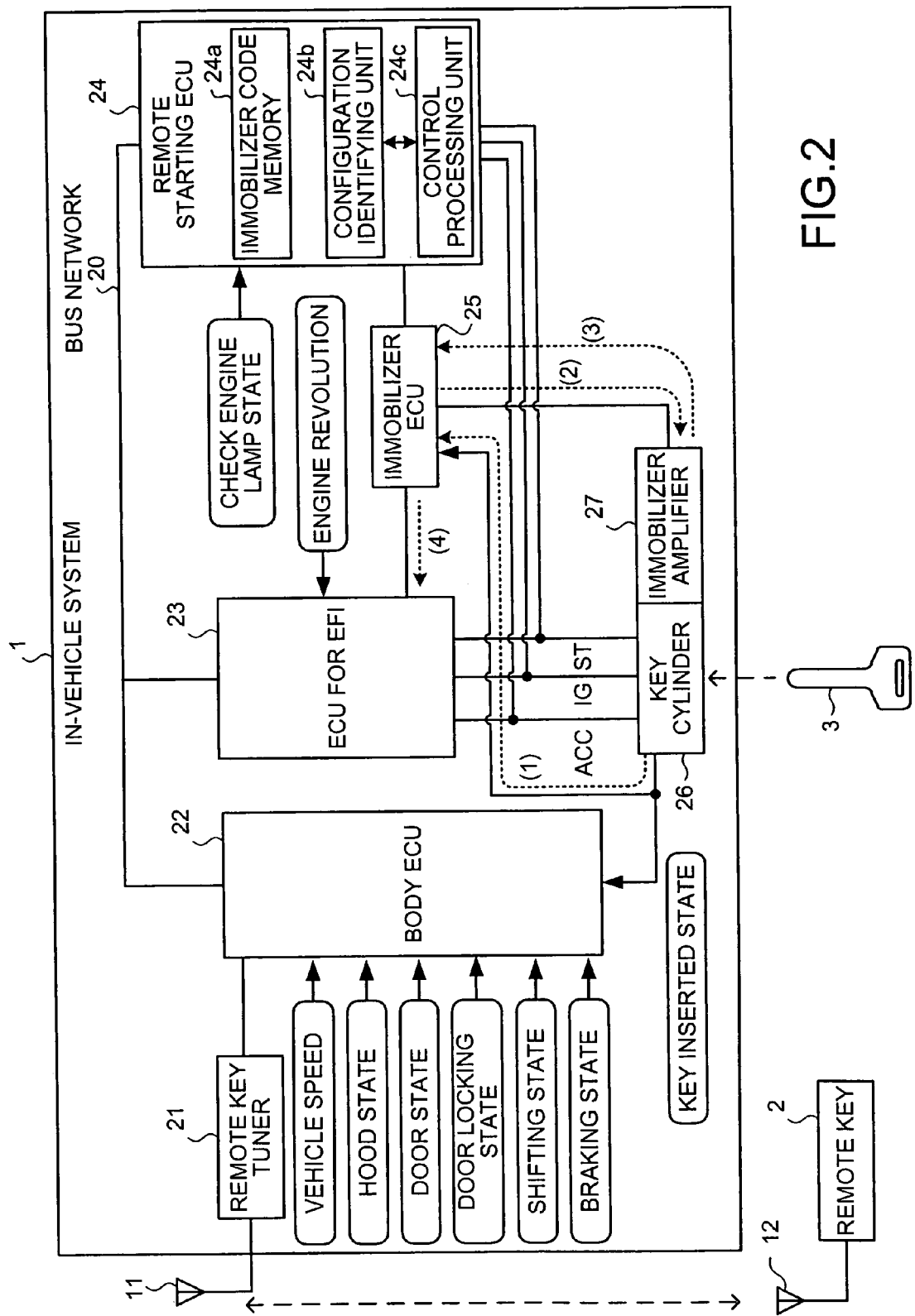
FIG. 2 is for explaining manual starting in the in-vehicle system shown in FIG. 1.

The process procedure for canceling the inhibition on starting the engine is shown in FIG. 2. At first, the key cylinder 26 detects insertion of the key 3 and notifies the detection of the key 3 to the immobilizer ECU 25 (process (1)). Upon receiving the notification, the immobilizer ECU 25 requests the immobilizer amplifier 27 to transmit the key code (process (2)). The immobilizer amplifier 27 communicates with the key 3 by wireless communication, reads out the key code stored in a transponder built-in the key 3, and transmits the key code to the immobilizer (process (3)). The immobilizer ECU 25 determines conformity between the key code received from the immobilizer amplifier 27 and a key code stored in the immobilizer ECU 25 itself. When the two codes are identical, the immobilizer ECU 25 determines that the key 3 is authentic and imparts a starting permission to the ECU for EFI 23 to cancel inhibition on starting the engine (process (4)).

When the user inserts an authentic key into the key cylinder 26, the immobilizer ECU 25 automatically cancels the inhibition on starting the engine. When the user turns the key 3, signals are transmitted in the ignition line, the starter line, and an accessory line (ACC) that controls power supply to in-vehicle equipment. As a result, the starter motor gets activated and the ECU for EFI 23 controls fuel and ignition to start the engine. In contrast, when a non-authentic key is inserted into the key cylinder 26, the ECU for EFI 23 is maintained in the state of starting inhibition. As a result, even if the starter motor is driven by turning the key, the ECU for EFI 23 is not operated so that the engine does not start.

The remote starting ECU 24 is configured to starting the engine based on remote operation. When starting the engine with the remote operation, the key 3 is not used, so that the immobilizer ECU 25 can not perform the authentication check and hence the immobilizer ECU 25 is maintained in the state of starting inhibition. To solve this problem, the remote starting ECU 24 includes an immobilizer code memory 24a that stores therein an immobilizer code that functions in the same manner as the key code. The immobilizer code memory 24a can be a nonvolatile memory.

Figure 3:
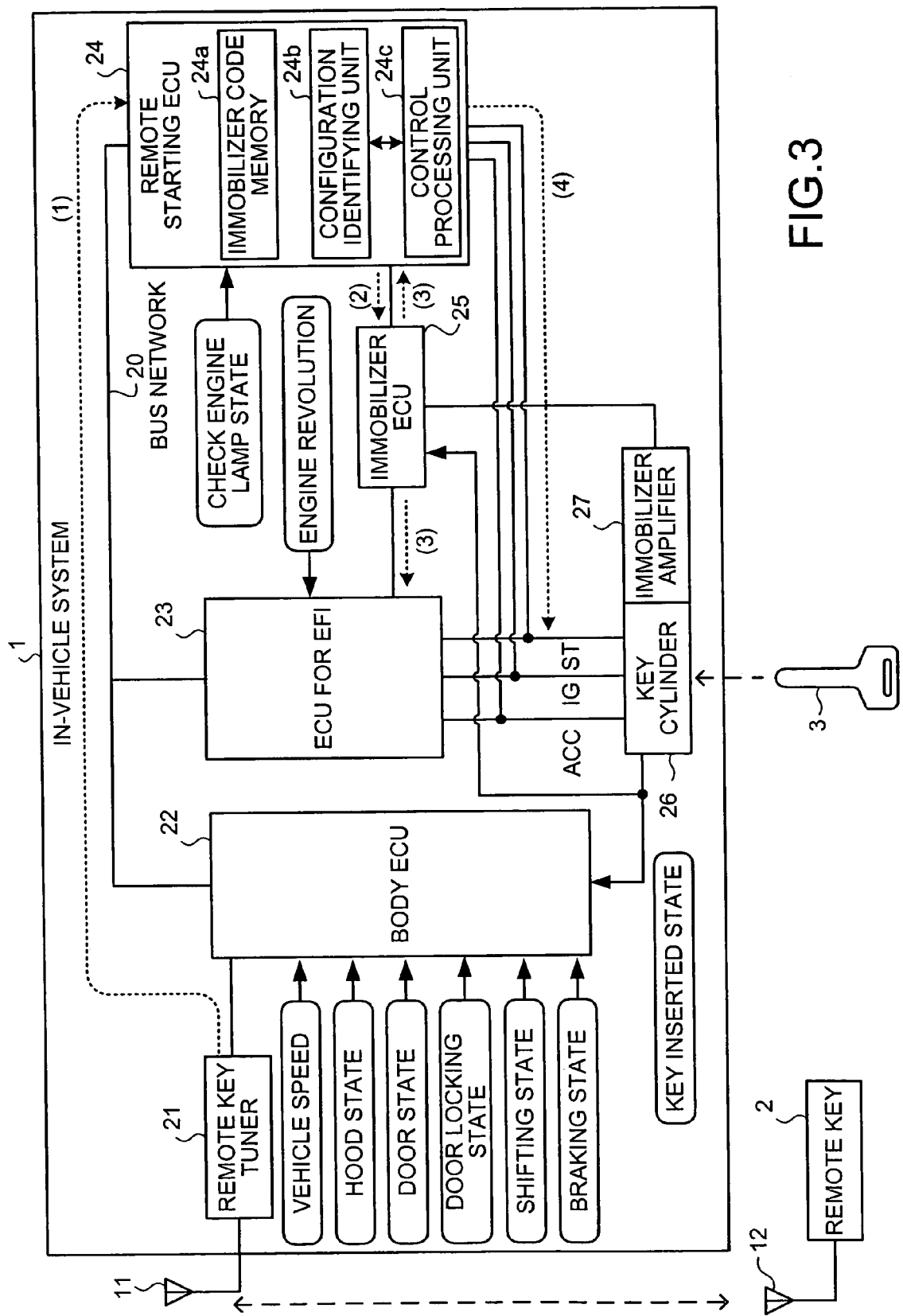
FIG. 3 is for explaining remote starting in the in-vehicle system shown in FIG. 1.

The process procedure for starting the engine by the remote starting ECU 24 is shown in FIG. 3. At first, the remote key tuner 21 receives an engine starting request from the remote key 2 and notifies reception of the engine starting request to the remote starting ECU 24 via the body ECU 22 and the bus network 20 (process (1)). In response to the reception of the starting request, the remote starting ECU 24 sends a cancellation request to the immobilizer ECU 25 (process (2)). In response to the reception of the cancellation request, the immobilizer ECU 25 conducts authentication check based on the immobilizer code. If the immobilizer code is authentic, the immobilizer ECU 25 imparts a starting permission to the ECU for EFI 23, and also notifies the remote starting ECU 24 that the starting inhibition is canceled (process (3)).

The remote starting ECU 24 then outputs respective false signals via the accessory line, the ignition line, and the starter line to start the engine (process (4)).

Figure 4:
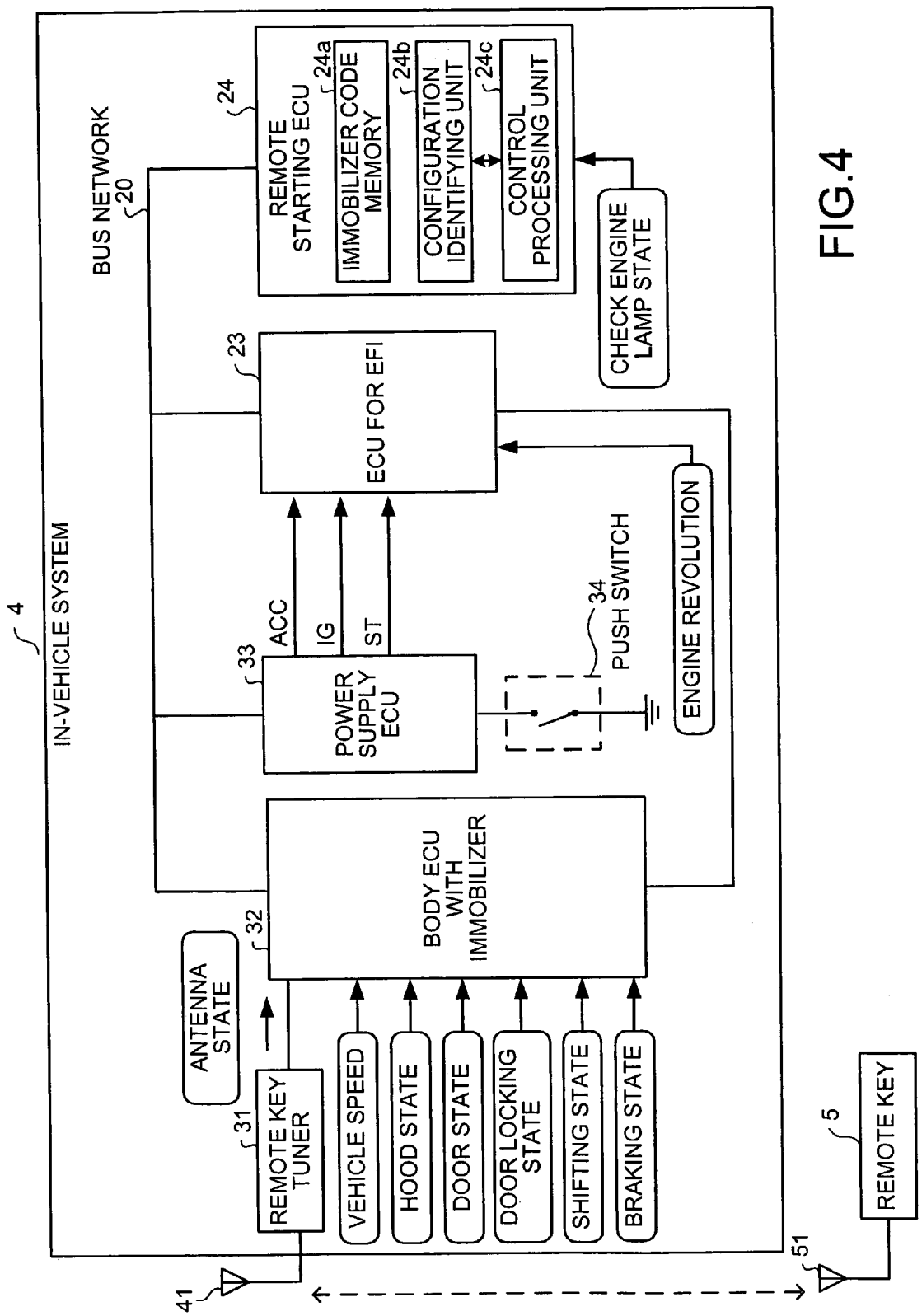
FIG. 4 is a block diagram of an in-vehicle system with the electronic configuration.

FIG. 4 is a block diagram of an in-vehicle system 4 according to another embodiment of the present invention with the electronic configuration. The in-vehicle system 4 includes a remote key tuner 31, a body ECU with immobilizer 32, a power supply ECU 33, the ECU for EFI 23, the remote starting ECU 24, and a push switch 34. The ECU for EFI 23 and the remote starting ECU 24 are the same components as those of the in-vehicle system 1 shown in FIG. 1.

The user of the vehicle in which the in-vehicle system 4 is installed is given a remote key 5. The remote key 2 is provided with an antenna 51. The remote key 5 has same functions as the remote key 2 shown in FIG. 1.

The remote key tuner 31 includes, although only one antenna is shown in FIG. 4, a plurality of antennas 41. Some of the antennas are provided inside and some of the antennas are provided outside of the vehicle. The remote key tuner 31 receives signals indicative of requests from the remote key 5.

The body ECU with immobilizer 32 includes the function of both the body ECU 22 and the immobilizer ECU 25 shown in FIG. 1. Moreover, the body ECU with immobilizer 32 determines whether the remote key 5 is operated from inside or outside of the vehicle based on which antenna of the remote key tuner 31 received a request from the remote key 5. Furthermore, the body ECU with immobilizer 32 controls the states of the vehicle and engine starting inhibition/cancellation. Furthermore, the body ECU with immobilizer 32 conducts an authentication check based on a key code obtained from the remote key 5 to check whether the remote key 5 is authentic.

The power supply ECU 33 is configured to control the starting control for the ECU for EFI 23, and controls the accessory line, the ignition line, the starter line in response to an operation of the push switch 34 by the user.

Figure 5:
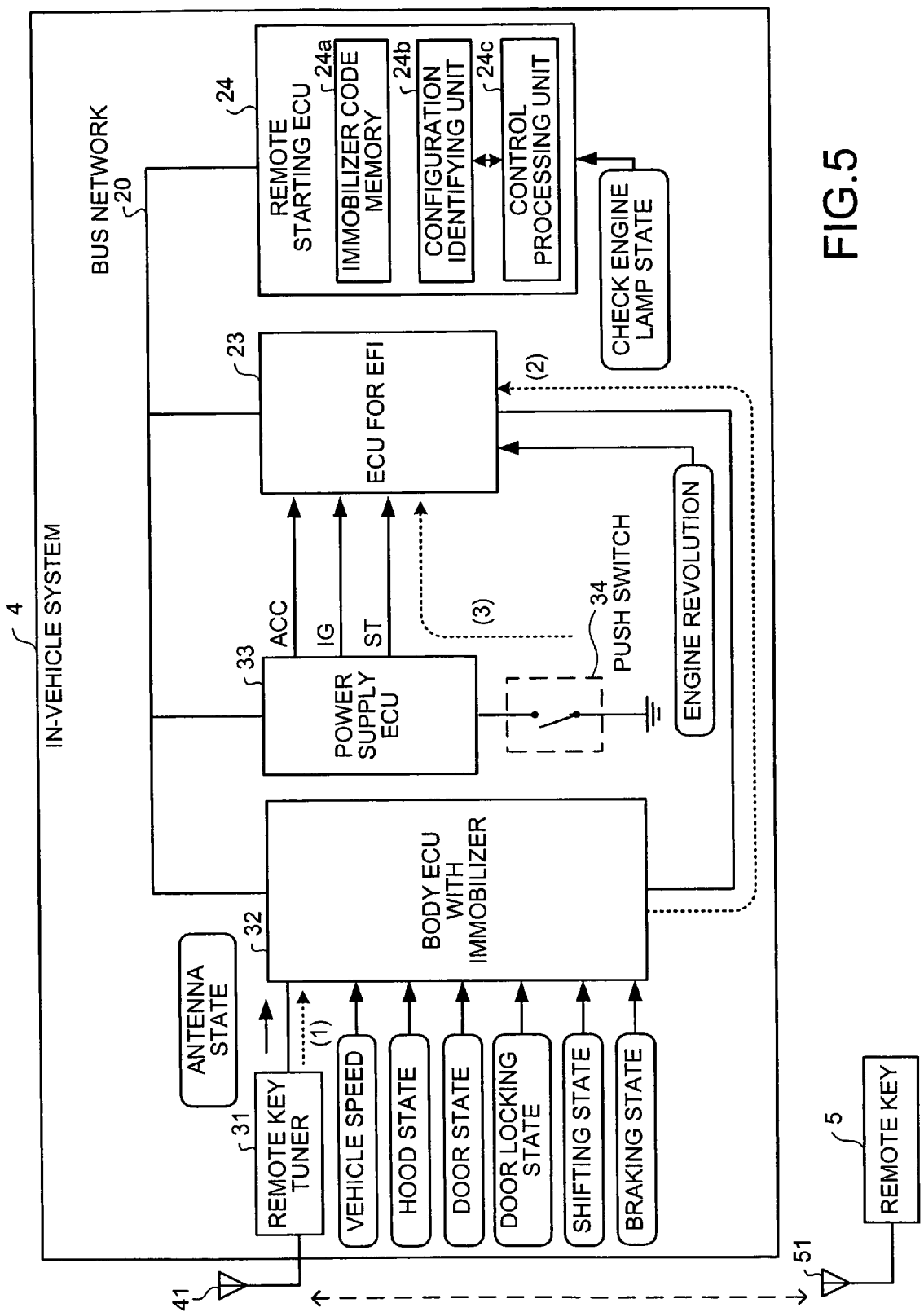
FIG. 5 is for explaining manual starting in the in-vehicle system shown in FIG. 4 according to another embodiment of the present invention.

The process procedure for starting the engine in response to the operation of the push switch 34 is shown in FIG. 5. At first, assuming that the remote key 5 is operated from inside of the vehicle, when the remote key tuner 31 communicates with the remote key 5, the body ECU with immobilizer 32 conducts the authentication check (process (1)). When the remote key 5 is authentic, the body ECU with immobilizer 32 imparts a starting permission to the ECU for EFI 23 to cancel the inhibition on starting the engine (process (2)). Then, as the user operates the push switch 34, the power supply ECU 33 controls the accessory line, the ignition line, and the starter line to start the engine (process (3)).

When the remote key 5 is not operated from inside of the vehicle, the remote starting ECU 24 carries out the procedure of starting the engine. In this procedure, using the immobilizer code in the immobilizer code memory 24a, the remote starting ECU 24 cancels the inhibition on starting the engine instructed by the body ECU with immobilizer 32.

Figure 6:
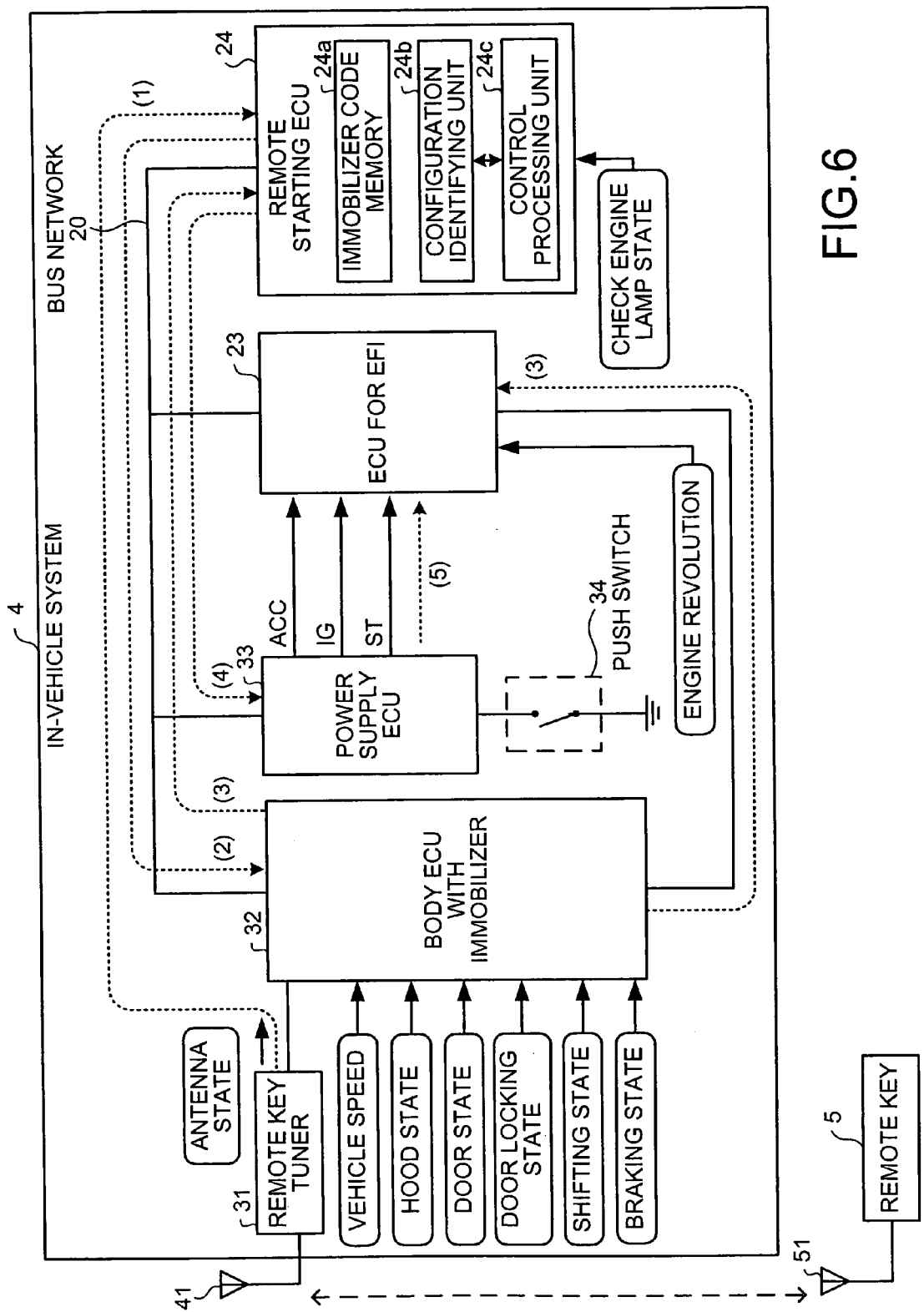
FIG. 6 is for explaining remote starting in the in-vehicle system shown in FIG. 4.

The process procedure performed when starting the engine remotely is shown in FIG. 6. At first, the remote key tuner 31 receives an engine starting request transmitted from the remote key 5, and notifies reception of the engine starting request to the remote starting ECU 24 via the body ECU with immobilizer 32 and the bus network 20 (process (1)). In response to the reception of the starting request, the remote starting ECU 24 sends a cancellation request to the body ECU with immobilizer 32 via the bus network (process (2)). In response to the reception of the cancellation request the cancellation request, the body ECU with immobilizer 32 conducts authentication check of the remote starting ECU 24, and when the authentication is successfully completed, the body ECU with immobilizer 32 imparts a starting permission to the ECU for EFI 23, and also notifies the remote starting ECU 24 that the starting inhibition is canceled (process (3)). The remote starting ECU 24 then outputs an operating instruction to the power supply ECU 33 (process (4)), and in response to the reception of the operating instruction, the power supply ECU 33 outputs signals in the accessory line, the ignition line, and the starter line to start the engine (process (5)).

Precisely, when the remote starting ECU 24 is installed in the vehicle having the mechanical configuration shown in FIG. 1, the remote starting ECU 24 directly controls the accessory line, the ignition line, and the starter line to start the engine. In contrast, when the remote starting ECU 24 is installed in the vehicle having the electronic configuration shown in FIG. 4, the remote starting ECU 24 controls the accessory line, the ignition line, and the starter line by outputting the operating instruction to the power supply ECU 33 via the bus network 20. Furthermore, communication with the immobilizer is carried out without the bus network 20 in the mechanical configuration. In contrast, communication with the immobilizer carried out via the bus network 20 in the case of the electronic configuration.

The remote starting ECU 24 includes respective starting processing programs associated to the mechanical configuration and the electronic configuration in advance, to identify whether the vehicle installed with the unit is provided with the mechanical configuration or the electronic configuration with a configuration identifying unit 24b. A control processing unit 24c selects appropriate starting control based on a result of identification, and carries out the selected program. Precisely, the starting control apparatus for providing starting control of the vehicle in response to a signal received from the terminal for remote operations, or self-directively includes the configuration identifying unit that identifies whether a configuration to be installed in the vehicle for starting the vehicle is the electronic configuration for starting without operating a key, or the mechanical configuration for starting by operating a key (steps S105 to S109 explained below with reference to FIG. 7), and the control processing unit that includes respective starting processing programs (steps S103 and S104 explained below with reference to FIG. 7) associated to the mechanical configuration and the electronic configuration in advance, and selects one of the starting processing programs according to the result identified by the configuration identifying unit and carries out the selected program.

The configuration identifying unit 24b can identify the configuration of the associated vehicle based on two methods: identifying the configuration of the vehicle based on manually starting, identifying the configuration of the vehicle based on monitoring flow of signals.

The method of identifying the configuration of the vehicle based on manually starting is explained first. When manually starting the engine in the mechanical configuration (in-vehicle system 1), the key cylinder 26 detects insertion of the key 3 and outputs a key detection signal. In contrast, when manually starting the engine in the electronic configuration (in-vehicle system 4), the push switch 34 is turned on and a push switch signal is output.

The key detection signal and the push switch signal are unique signals. The configuration identifying unit 24b identifies that configuration is mechanical if the key detection signal is output. On the other hand, the configuration identifying unit 24b identifies that configuration is electronic if the push switch signal is output. The configuration identifying unit 24b stores a result of identification in a storage area (memory) in the configuration identifying unit 24b. The key detection signal is output from the body ECU 22, and the push switch signal is output from the power supply ECU 33 respectively to the bus network 20. The remote starting ECU 24 determines which signal is output according to information output to the bus network 20. Alternatively, each of the signals can be input directly to the remote starting ECU 24 without the bus network 20.

Figure 7:
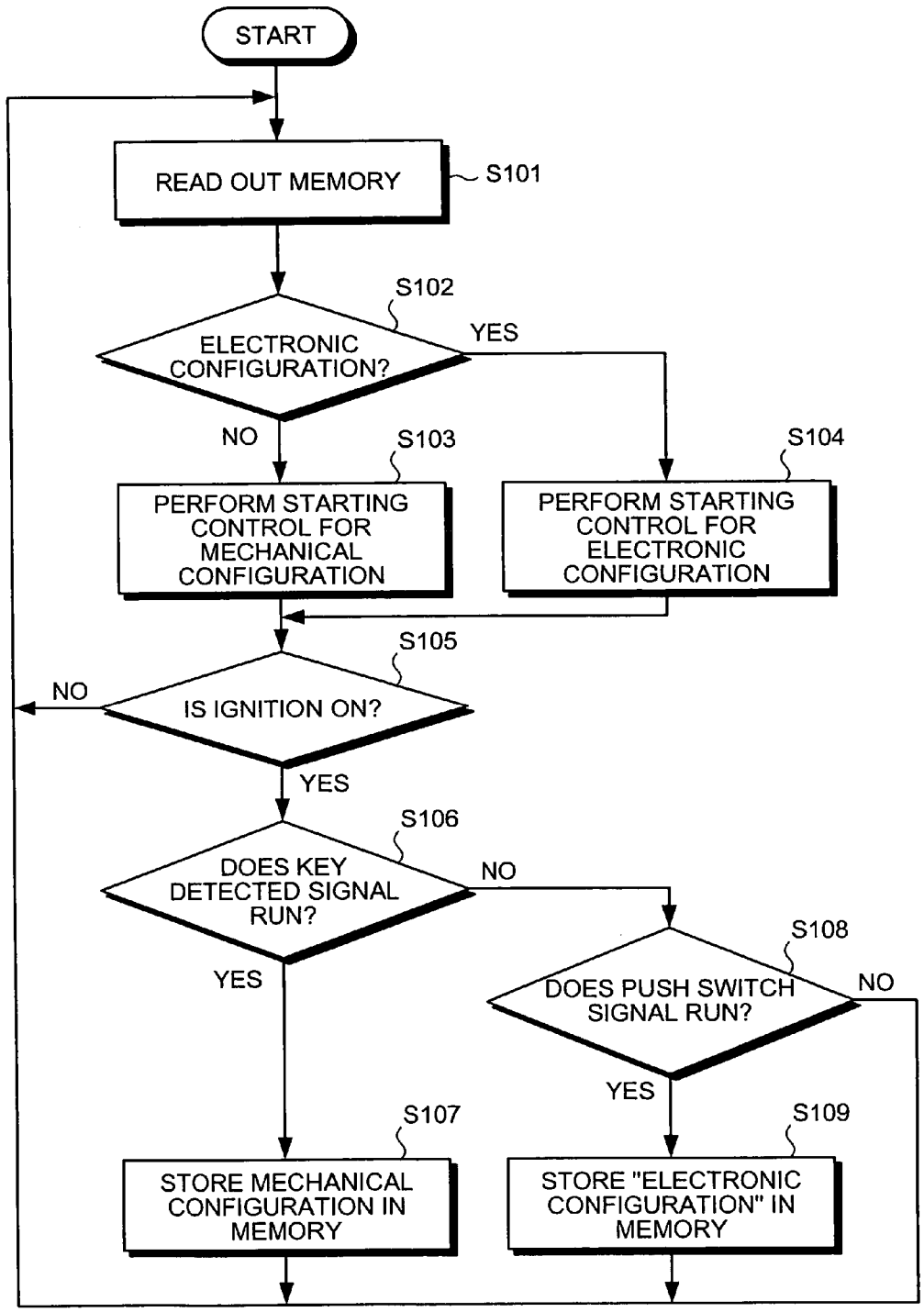
FIG. 7 is a flowchart of a process procedure for identifying the configuration of the vehicle based on manually starting.

FIG. 7 is a flowchart of a process procedure for identifying the configuration of the vehicle based on manually starting. At first, the control processing unit 24c reads outs contents stored in the memory of the configuration identifying unit 24b (step S101).

When the read contents indicate that the configuration is the electronic configuration (step S102, Yes), the starting control for the electronic configuration illustrated in FIG. 6 is carried out (step S104). When the read contents indicate that the configuration is not the electronic configuration (step S102, No), the starting control for the mechanical configuration illustrated in FIG. 3 is carried out (step S103).

Subsequently, a state of the ignition line is confirmed (step S105). When the ignition is OFF (step S105, No), the processing returns to step S101. The processing flow from steps S101 to S105 is a part of the main routine. Alternatively, step S105 can be omitted.

In contrast, when the ignition line is ON (step S105, Yes), the configuration identifying unit 24b determines whether the key detection signal runs in the bus network 20 (step S106). When the key detection signal runs (step S106, Yes), the configuration identifying unit 24b stores information indicative of the fact that the configuration of the vehicle is the mechanical configuration in the memory (step S107), and the processing returns to step S101.

In contrast, when the key detection signal does not run (step S106, No), the configuration identifying unit 24b determines whether the push switch signal runs in the bus network 20 (step S108). If the push switch signal runs (step S108, Yes), the configuration identifying unit 24b stores information indicative of the fact that the configuration of the vehicle is the electronic configuration in the memory (step S109), and the processing shifts to step S101. When the push switch signal does not run (step S108, No), the processing directly shifts to step S101.

Thus, by monitoring an operation during the manual start to identify and store the configuration, after manually starting the engine at first, the engine can be remotely started with an appropriate operation suited to the vehicle configuration.

Figure 8:
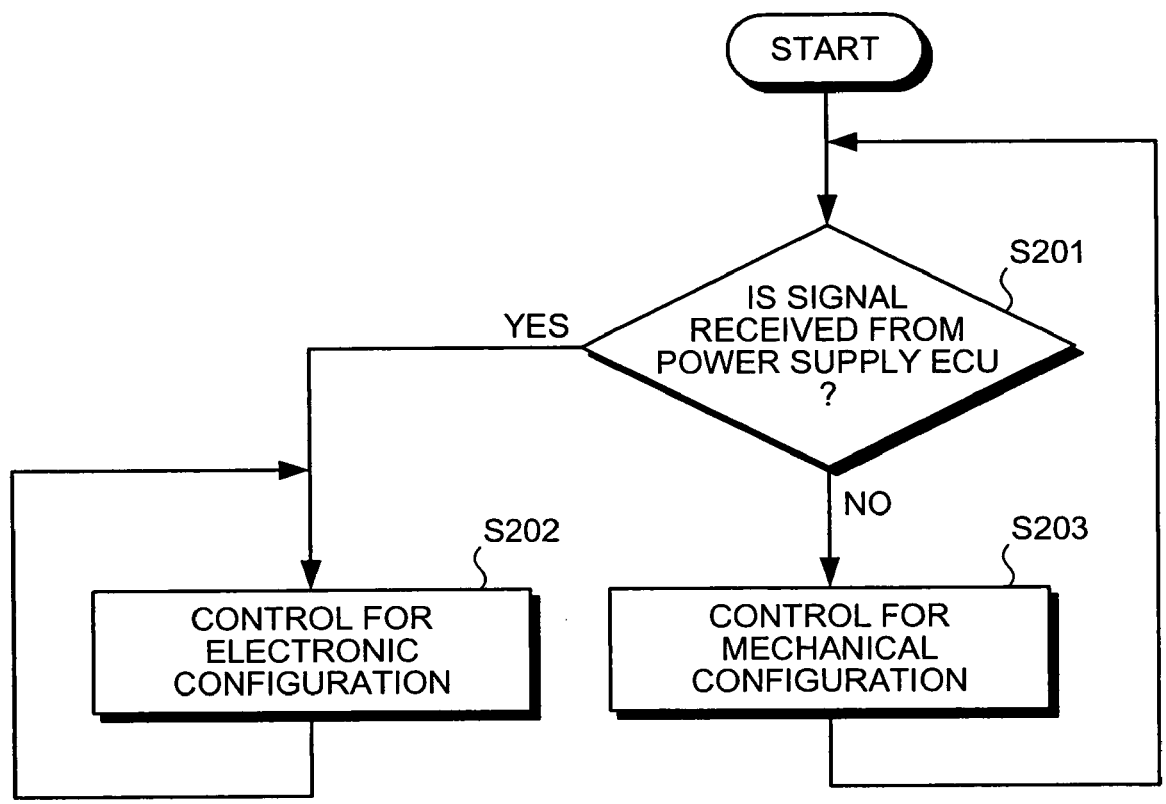
FIG. 8 is a flowchart of a process procedure for identifying the configuration of the vehicle based on monitoring flow of signals.

FIG. 8 is a flowchart of a process procedure for identifying the configuration of the vehicle based on monitoring flow of signals. To operate in response to a turning operation of the key 3 in the mechanical configuration (in-vehicle system 1), the electronic configuration (in-vehicle system 4) includes the power supply ECU 33.

Therefore, when the remote starting ECU 24 receives a signal transmitted from the power supply ECU 33, because the signal is a unique to the electronic configuration, the configuration identifying unit 24b can identify that the vehicle includes the electronic configuration.

As shown in FIG. 8, at first, the configuration identifying unit 24b monitors a state of the bus network 20 and determines whether the bus network 20 receives the signal from the power supply ECU 33 (step S201).

When the bus network 20 does not receive the signal from the power supply ECU 33 (step S201, No), the control processing unit 24c employs the starting operation for the mechanical configuration explained by referring to FIG. 3 (step S203), and the processing returns to step S201.

In contract, when the bus network 20 receives the signal from the power supply ECU 33 (step S201, Yes), the control processing unit 24c employs the control for the electronic configuration explained by referring to FIG. 6 (step S202) afterwards.

Thus, by monitoring output from a particular component, the vehicle configuration is identified regardless of the manual start, and the engine can be remotely started with an appropriate operation.

To sum up, with the in-vehicle system according to the exemplary embodiments, the configuration identifying unit 24b in the remote starting ECU 24 receives a unique signal according to a particular configuration, specifically the key detection signal in the mechanical configuration, the push switch signal in the electronic configuration, or a signal transmitted from the power supply ECU 33, to identify the configuration of the associated vehicle, and the control processing unit 24c selects an appropriate control suited to the configuration, so that the starting control apparatus with wider versatility, which automatically identifies the configuration of the vehicle to be installed with the apparatus itself and carries out an appropriate operation, can be achieved.

The exemplary embodiments are explained with reference to the mechanical configuration and the electronic configuration. However, the present invention is not limited to this, and also applicable to other configurations that include different control methods depending on a configuration of a vehicle to be installed with the apparatus itself.

Furthermore, effects and variations can be easily derived by those skilled in the art. Aspects of the present invention are not limited to the specific embodiments explained above. Thus, various modifications are possible within the scope of the idea of the invention according to the attached claims and the likes.

With the starting control apparatus according to one aspect, it becomes possible to automatically identify the configuration of the vehicle in which the starting control apparatus itself and carry out appropriate starting operation.

Although the invention has been described with respect to a specific embodiment for a complete and clear disclosure, the appended claims are not to be thus limited but are to be construed as embodying all modifications and alternative constructions that may occur to one skilled in the art that fairly fall within the basic teaching herein set forth.

What is claimed is:

1. An apparatus that controls starting of an engine of a vehicle any one of self-directively and in response to a remote signal received from a remote terminal, the apparatus comprising:
   a configuration identifying unit that identifies a configuration of the vehicle; and
   a control processing unit that selects starting control for the engine based on identified configuration and carries out selected starting control on the engine.

2. The apparatus according to claim 1, wherein the configuration identifying unit includes
   a signal outputting unit that outputs a configuration signal unique to the configuration of the vehicle; and
   an identifying unit that identifies the configuration of the vehicle based on the configuration signal.

3. The apparatus according to claim 2, wherein the configuration of the vehicle includes any one of
   an electronic configuration in which the engine is started with electronic operation; and
   a mechanical configuration in which the engine is started with mechanical operation.

4. The apparatus according to claim 3, wherein the signal outputting unit outputs a configuration signal indicative of the electronic configuration when the electronic operation is performed.

5. The apparatus according to claim 4, further comprising an electric switch to start the engine, and the electronic operation includes operating the electric switch.

6. The apparatus according to claim 3, wherein the signal outputting unit outputs a configuration signal indicative of the mechanical configuration when the mechanical operation is performed.

7. The apparatus according to claim 6, further comprising a key and a key cylinder, and the mechanical operation includes inserting the key in the key cylinder.

8. The apparatus according to claim 2, further comprising a signal detecting unit that detects a signal transmitted from a control unit for managing starting control for an engine controller, wherein the signal outputting unit outputs a configuration signal indicative of the electronic configuration when the signal detecting unit detects the signal.

9. The apparatus according to claim 2, wherein the signal outputting unit outputs a configuration signal indicative of the mechanical configuration when the configuration of the vehicle can not be identified.

10. The apparatus according to claim 1, wherein the signal outputting unit outputs the configuration signal to an in-vehicle network, and the identifying unit acquires the configuration signal the in-vehicle network.

11. A method of controlling starting of an engine of a vehicle any one of self-directively and in response to a remote signal received from a remote terminal, the method comprising:

identifying a configuration of the vehicle; and selecting starting control for the engine based on identified configuration; and carrying out selected staring control.

* * * * *